(12) United States Patent
Gailliard et al.

(10) Patent No.: US 12,049,959 B2
(45) Date of Patent: Jul. 30, 2024

(54) ASSEMBLY FOR ACTUATING AND SYSTEM FOR INTERLOCKING TWO GEARBOX FORK SHAFTS

(71) Applicant: RENAULT S.A.S, Boulogne Billancourt (FR)

(72) Inventors: Fabien Gailliard, Guyancourt (FR); Salim Sahraoui, Guyancourt (FR)

( * ) Notice: Subject to any disclaimer, the term of this patent is extended or adjusted under 35 U.S.C. 154(b) by 0 days.

(21) Appl. No.: 18/251,637

(22) PCT Filed: Nov. 4, 2021

(86) PCT No.: PCT/EP2021/080617
§ 371 (c)(1),
(2) Date: May 3, 2023

(87) PCT Pub. No.: WO2022/096562
PCT Pub. Date: May 12, 2022

(65) Prior Publication Data
US 2023/0407966 A1 Dec. 21, 2023

(30) Foreign Application Priority Data

Nov. 4, 2020 (FR) ..................................... 20 11323

(51) Int. Cl.
*F16H 63/36* (2006.01)
*F16H 63/24* (2006.01)
*F16H 63/32* (2006.01)

(52) U.S. Cl.
CPC ............. *F16H 63/36* (2013.01); *F16H 63/24* (2013.01); *F16H 63/32* (2013.01)

(58) Field of Classification Search
CPC ........... F16H 63/36; F16H 63/24; F16H 63/32
See application file for complete search history.

(56) References Cited

U.S. PATENT DOCUMENTS

| 2,299,889 | A | * | 10/1942 | Fishburn | F16H 63/285 74/333 |
| 2,317,761 | A | | 4/1943 | Haigh | |

(Continued)

FOREIGN PATENT DOCUMENTS

| DE | 10 2012 112 509 A1 | 7/2013 |
| JP | 45-12085 Y1 | 5/1970 |

OTHER PUBLICATIONS

International Search Report issued Jan. 19, 2022 in PCT/EP2021/080617 filed on Nov. 4, 2021, citing documents 1-2 & 15-16 therein, 2 pages.

(Continued)

*Primary Examiner* — Victor L MacArthur
(74) *Attorney, Agent, or Firm* — Oblon, McClelland, Maier & Neustadt, L.L.P.

(57) ABSTRACT

An assembly actuates two fork shafts of a gearbox which includes two rotating actuators and a system for interlocking with a first lever which supports a drive finger of a first fork and a cam the profile of which comprises a notch for locking the first lever; a second lever which supports a drive finger of a second fork and a cam the profile of which comprises a second notch for locking the second lever; and a pivoting interlocking rocker which supports a locking pin that is able to interact with one or other of the two locking notches in order to angularly lock the associated lever when the other lever is actuated in order to engage a gear ratio.

10 Claims, 7 Drawing Sheets

(56) References Cited

U.S. PATENT DOCUMENTS

| | | | | |
|---|---|---|---|---|
| 2,438,691 | A | * 3/1948 | Armantrout | F16H 63/36 74/473.26 |
| 2,611,249 | A | 9/1952 | Ashton | |
| 3,264,894 | A | * 8/1966 | Popovich | F16H 63/36 74/473.24 |
| 3,486,392 | A | * 12/1969 | Ivanchich | F16H 63/36 74/473.25 |
| 3,526,151 | A | * 9/1970 | Miller | F16H 63/36 74/473.24 |

OTHER PUBLICATIONS

Preliminary French Search Report issued Jun. 9, 2021 in French Application 20 11323 filed on Nov. 4, 2020, citing documents 1-2 & 15-16 therein, 3 pages (with English Translation of Categories of Cited Documents).

* cited by examiner

ASSEMBLY FOR ACTUATING AND SYSTEM FOR INTERLOCKING TWO GEARBOX FORK SHAFTS

TECHNICAL FIELD OF THE INVENTION

The present invention relates to an assembly for actuating at least two forks of a gearbox which has a mechanical interlocking system.

The invention can notably be applied to what is referred to as an automated gearbox, in which each fork shaft is connected to a shaft the movements of which are caused by motorized actuators managed by a control unit.

TECHNICAL BACKGROUND

To manage gear changes, what is known is an internal control assembly composed, for example, of an actuator and a fork shaft or spindle dedicated to the ratios or gears referred to as electric ratios or gears in relation to the electric motor of an electric motor of a transmission and a hybrid drive of a motor vehicle; two shafts and two forks dedicated to the ratios referred to as combustion engine ratios in relation to the combustion engine of this hybrid drive.

The principle of such a "hybrid" gearbox is to be able to change combustion engine ratios and electric gear ratios at the same time. However, two ratios of one and the same category (electric or combustion engine) must not be able to be changed at the same time.

This involves the principle referred to as interlocking of the ratios.

It thus relates to the two shafts and forks for changing the combustion engine ratios.

In a known way, each fork shaft is associated with a first motor which drives the rotation of an eccentric finger which drives the fork shaft independently of the others.

The interlocking function is first of all provided by the management of each of the rotary actuators or motors.

To increase safety, the invention proposes a design for a mechanical interlocking system which can be incorporated in the motorized actuation assembly.

SUMMARY OF THE INVENTION

The invention proposes a system for interlocking the movements of two shafts of forks of a gearbox, which system comprises:
a) a first lever which:
  is mounted so as to be able to pivot, about a first axis, in two opposite directions to take up at least one active angular position in relation to a neutral intermediate angular position;
  bears a first eccentric axial finger connected to a first driveshaft of a first fork;
  bears a first eccentric cam, the cam profile of which has a first notch for locking the first lever in its neutral position;
b) a second lever which:
  is mounted so as to be able to pivot, about a second axis parallel to the first axis, in two opposite directions to take up at least one active angular position in relation to a neutral intermediate angular position;
  bears a second eccentric axial finger connected to a second driveshaft of a second fork;
  bears a second eccentric cam, the cam profile of which has a second notch for locking the second lever in its neutral position;
c) and an interlocking rocker which:
  is mounted so as to be able to pivot, about a rocking axis parallel to the first axis, in two opposite directions to take up one or the other of two opposite locking angular positions, in relation to an intermediate angular position of rest toward which the interlocking rocker is elastically returned;
  bears an eccentric axial locking pin which, when the interlocking rocker is in its angular position of rest and when each drive lever is in its neutral angular position, is positioned facing the first locking notch and the second locking notch at the same time,
in which system, angularly on either side of its locking notch, each cam profile of a lever has an active portion which is able to interact with the locking pin to cause the interlocking rocker to pivot and the locking pin to engage in the locking notch of the cam of the other lever, and then to hold the locking pin in this locking engaged position to angularly lock said other lever in its neutral position.

According to other features of the interlocking system:
each cam profile has at least one active portion in the shape of a convex circular arc centered on the axis of the associated lever which is adjacent to the locking notch;
irrespective of the angular position of each lever, the first axis, the locking pin and the second axis are aligned;
when the interlocking rocker is in its angular position of rest and when each lever is in its neutral angular position, the first axis, the first locking notch, the locking pin, the second locking notch and the second axis are aligned;
irrespective of the angular position of each lever, the locking pin is received between the first cam profile and the second cam profile;
each lever is a lever for driving an associated driveshaft of a fork;
the first lever is mounted so as to be able to pivot about the first axis in two opposite directions to take up one or the other of two opposite active angular positions in relation to its neutral intermediate angular position, and the second lever is mounted so as to be able to pivot about the second axis in two opposite directions to take up one or the other of two opposite active angular positions in relation to its neutral intermediate angular position;
each cam profile has two active portions in the shape of a convex circular arc which are centered on the axis of the associated lever and between which the locking notch is arranged.

The invention also proposes an assembly for actuating two shafts of forks of a gearbox, characterized in that said assembly has:
a first rotary actuator and a second rotary actuator which are controlled and the output shafts of which are parallel;
and a system for interlocking the movements of two shafts of forks according to the invention,
and wherein the first rotary actuator drives the pivoting of the first drive lever, and the second rotary actuator drives the pivoting of the second drive lever.

The axes of rotation of the output shafts of the two rotary actuators are orthogonal to the parallel sliding axes of the two fork shafts.

BRIEF DESCRIPTIONS OF THE FIGURES

Further features and advantages of the invention will become apparent from reading the following detailed description, for the understanding of which reference will be made to the appended drawings, in which.

DETAILED DESCRIPTION OF THE INVENTION

By convention, the geometric axes indicated in the figures are oriented from rear to front.

In the following description, elements that are identical, similar or analogous will be denoted by the same reference numerals.

Figure 1:
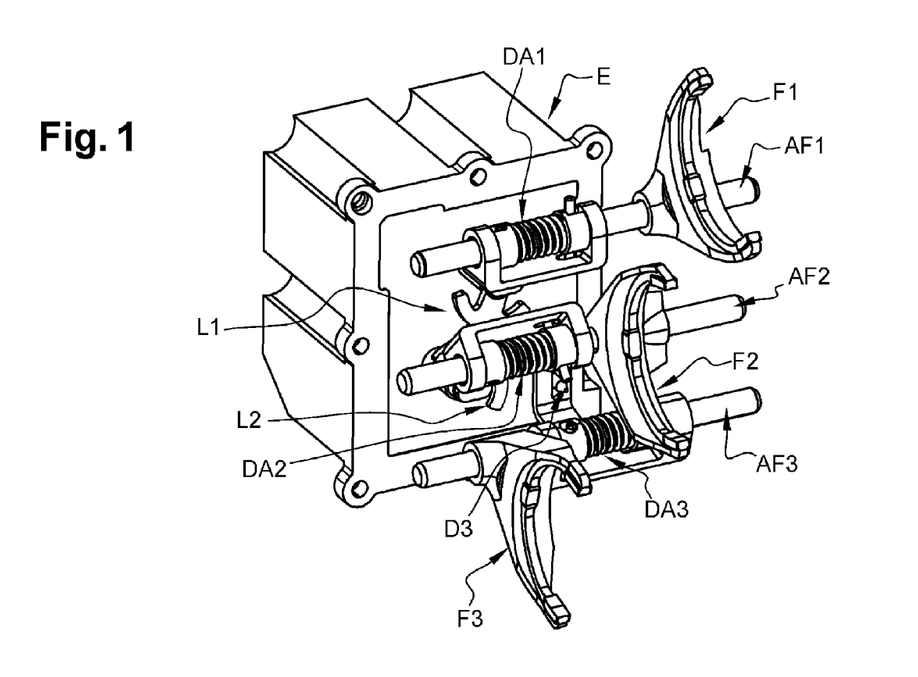
FIG. 1 is a perspective front view which shows an exemplary embodiment of an assembly for actuating three parallel shafts of forks for changing the ratios of a gearbox, two shafts of which are equipped with an interlocking system according to the invention.
Figure 2:
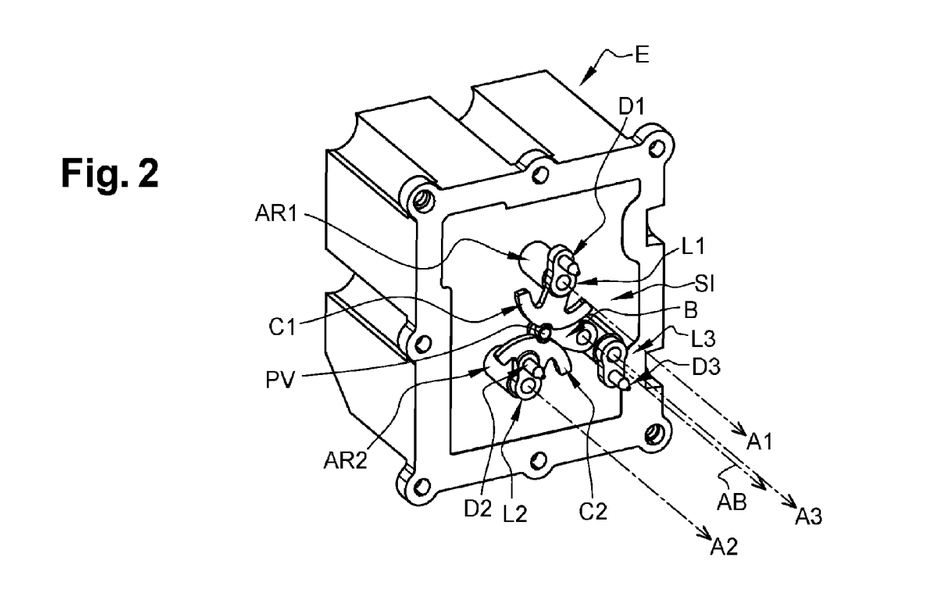
FIG. 2 is a view similar to that of FIG. 1, without the fork shafts or the associated forks.

FIG. 1 shows an assembly E for actuating three parallel shafts AF1, AF2 and AF3 of three forks F1, F2 and F3 belonging to a motor vehicle gearbox.

In a known manner, each fork shaft is fixed in terms of translational movement about the axis of its associated fork.

In a known manner and nonlimitingly, each shaft AF1, AF2 and AF3 drives the axial translational movement of the axial fork F1, F2 and F3 which for its part is connected in terms of translational movement to a ratio changing assistance device DA1, DA2 and DA3 of generally known design, such as that illustrated in document FR-A1-2.988.800.

By way of nonlimiting example, the two first torques AF1-F1 and AF2-F2 are used to change gear ratios referred to as "combustion engine" gear ratios to alter the rotational speed of a combustion engine, whereas the third torque AF3-F3 is used to change gear ratios referred to as "electric" gear ratios to alter the rotational speed of an electric motor which, for example, is part of a powertrain referred to as hybrid in association with the combustion engine.

Each transmission shaft is in this instance able to be driven axially in the two directions in relation to an intermediate axial position referred to as neutral, in which no ratio is engaged. The first torque AF1-F1 is, for example, able to bring about the change of a first ratio and a second ratio, whereas the second torque AF2-F2 is able to bring about the change of a third ratio and a fourth ratio.

To drive the first shaft AF1 and its associated fork F1, the actuating assembly E has a first controlled rotary actuator AR1 which is able to drive the pivoting of a first lever L1 in two opposite directions about a geometric pivoting axis A1.

To drive the second shaft AF2 and its associated fork F2, the actuating assembly E has a second controlled rotary actuator AR2 which is able to drive the pivoting of a second lever L2 in two opposite directions about a geometric pivoting axis A2.

The two rotary actuators AR1 and AR2 have parallel axes and each is, for example, the output shaft of an electric motor, not shown, which is incorporated in the actuating assembly E.

In accordance with the teachings of the invention, the movements of the two shafts AF1 and AF2 are associated with an interlocking system SI which is essentially made up of:

a first lever L1 which in this instance is the lever for driving the first shaft AF1 in the two directions;

a second lever L2 which in this instance is the lever for driving the second lever L2 in the two directions;

and an interlocking rocker B.

Figure 3A:
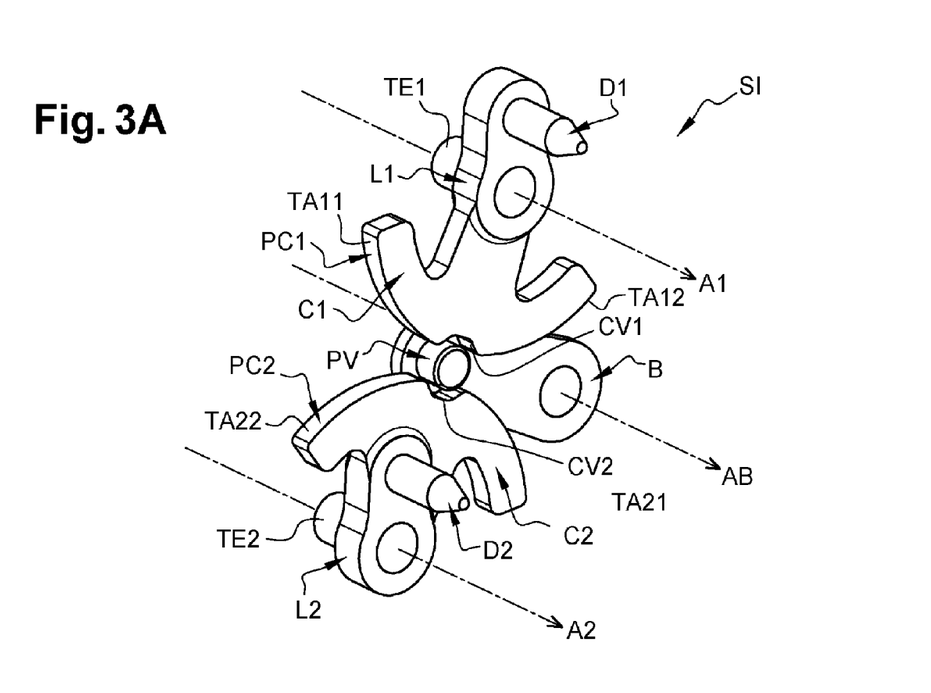
FIG. 3A is a perspective front view of the interlocking system of FIG. 2.
Figure 3B:
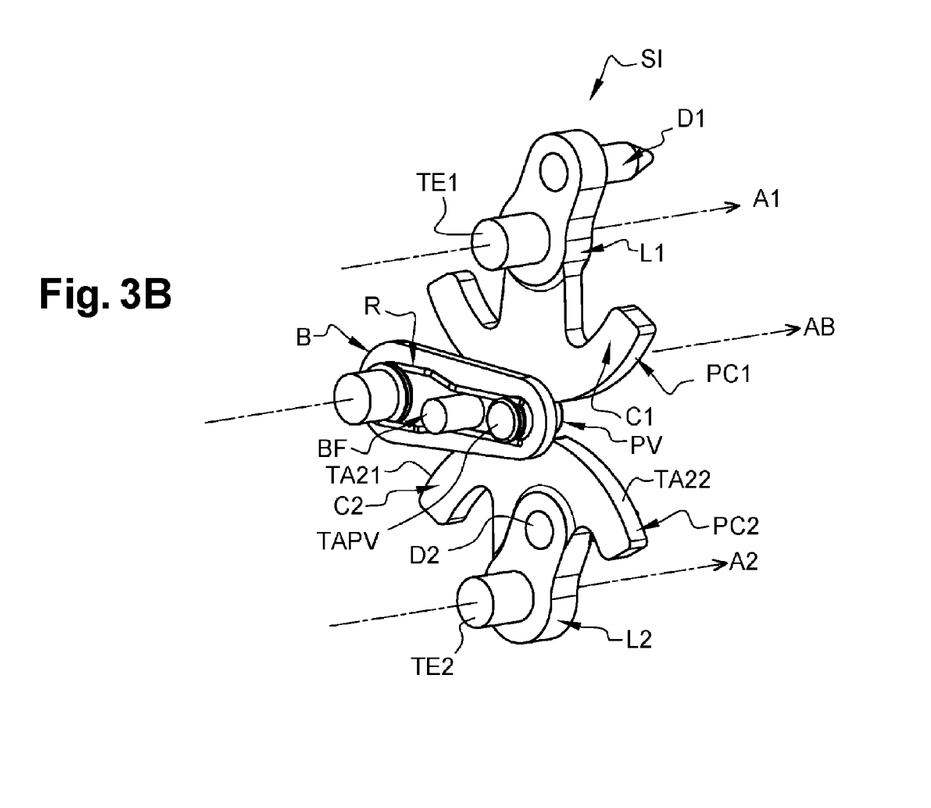
FIG. 3B is a perspective rear view of the interlocking system of FIG. 2.

As can be seen in detail in FIGS. 3A and 3B, the first lever L1 bears a first axial drive finger D1 which is eccentric in relation to the axis A1, extends axially to the front, and is connected to the first shaft AF1 of the first fork F1 via the assistance device DA1.

Here, diametrically opposite the first drive finger D1, the first lever L1 bears a first cam C1 which is eccentric in relation to the axis A1.

The convex cylindrical edge of the first cam C1 is a cam profile PC1 which has, in succession, a first active portion TA11 in the shape of a cylindrical arc, a first notch CV1 for angularly locking the first lever L1, and an opposite second active portion TA12 in the shape of a cylindrical arc.

The first lever L1 also has a first centered drive rod TE1 which extends axially to the rear and is driven by the first rotary actuator AR1.

Similarly, the second lever L2 bears a second axial drive finger D2 which is eccentric in relation to the axis A2, extends axially to the front, and is connected to the first shaft AF2 of the first fork F2 via the assistance device DA2.

Here, angularly offset in relation to the second drive finger D2, the second lever L2 bears a second cam C2 which is eccentric in relation to the axis A2.

The convex cylindrical edge of the second cam C2 is a cam profile PC2 which has, in succession, a first active portion TA21 in the shape of a cylindrical arc, a second notch CV2 for angularly locking the second lever L2, and an opposite second active portion TA22 in the shape of a cylindrical arc.

The second lever L2 also has a second centered drive rod TE2 which extends axially to the rear and is driven by the second rotary actuator AR2.

The first lever L1 is able to take up three separate functional angular positions, including one neutral position PM1, in which no ratio is engaged, and two opposite active angular positions: PA11, in which a first ratio is engaged, and PA12, in which a second ratio is engaged by the first fork F1.

The second lever L2 is able to take up three separate functional angular positions, including one neutral position PM2, in which no ratio is engaged, and two opposite active angular positions: PA21, in which a third ratio is engaged, and PA22, in which a fourth ratio is engaged by the second fork F2.

The relative positioning of the two levers L1 and L2 and their dimensions are such that there is a constant minimum gap EF between the two opposite convex cylindrical cam profiles PC1 and PC2.

As can be seen in FIGS. 3A, 3B and 4A, 4B, when each lever L1, L2 is in its neutral angular position PM1, PM2, the first axis A1, the first locking notch CV1, the second locking notch CV2 and the second axis A2 are aligned.

In the vicinity of its proximal end, the interlocking rocker B is mounted so as to be able to pivot in relation to the casing of the drive assembly E, about a rocking axis AB which is parallel to the pivot axes A1 and A2 of the two levers L1 and L2.

The interlocking rocker B in this instance is a plate which can pivot about the rocking axis AB in two opposite directions to take up one or the other of two opposite angular locking positions PV1 and PV2, in relation to its intermediate angular position of rest PR in which it is shown in FIGS. 3A to 4B.

The interlocking rocker B is constantly elastically returned toward its angular position of rest PR by means of the return system arranged on its rear face.

By way of nonlimiting example, the return system in this instance has a return spring R in what is referred to as a hairpin shape, which interacts with a fixed stop BF borne by the casing of the drive assembly E.

In the vicinity of its distal other end, the interlocking rocker B bears an eccentric cylindrical locking pin PV, which extends axially to the front and between the two cam profiles PC1 and PC2 to interact with the latter.

The outside diameter of the locking pin PV is greater than the value of the gap EF.

Figure 4A:
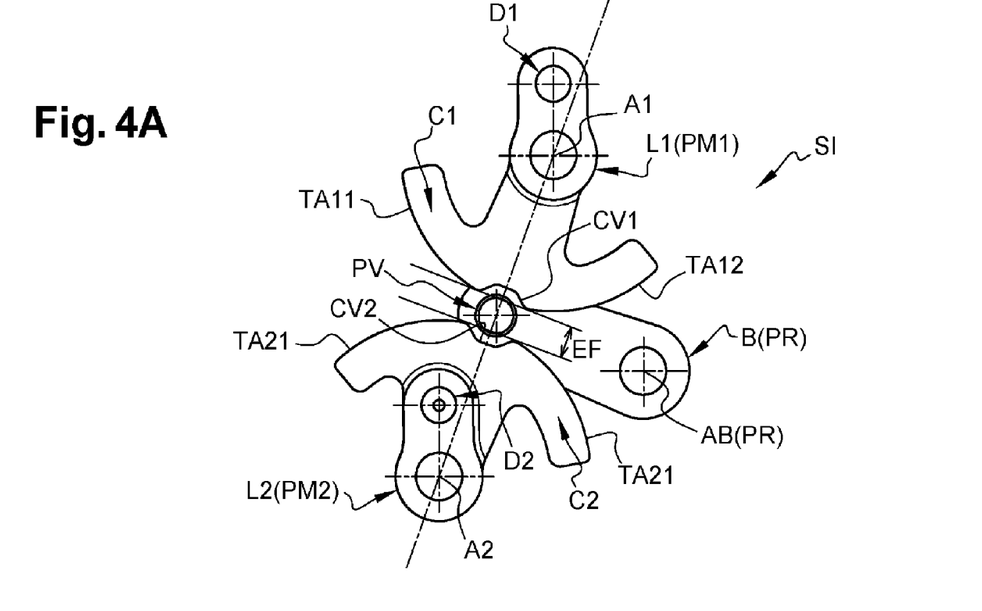
FIG. 4A is a front face view of the interlocking system of FIGS. 3A and 3B in which the two locking levers are shown each in its neutral position and the interlocking rocker is in its position of rest.

The positions and dimensions of the two levers L1 and L2 and of the interlocking rocker B are such that:
  irrespective of the angular position of each lever L1, L2 and of the interlocking rocker B, the locking pin PV is always located between the two cam profiles PC1 and PC2;
  when the interlocking rocker B is in its angular position of rest PR and when each drive lever L1, L2 is in its neutral angular position PM1, PM2, the first axis A1, the first locking notch CV1, the locking pin PV, the second locking notch CV2 and the second axis A2 are aligned and the locking pin PV is positioned facing the first locking notch CV1 and the second locking notch CV2 at the same time (see FIGS. 3A and 4A).

To ensure it is elastically returned toward its angular position of rest, the locking pin PV also extends axially to the rear between the free-end portions of the two arms of the hairpin-shaped return spring R.

The fixed stop BF is arranged between the pivot axis AB and the rear portion TAPV of the locking pin PV.

In the angular position of rest PR of the interlocking rocker B, the free-end portions of the two arms of the return spring R elastically bear against the cylindrical wall of the rear portion TAPV of the locking pin PV.

DESCRIPTION OF THE OPERATION

Figure 4B:
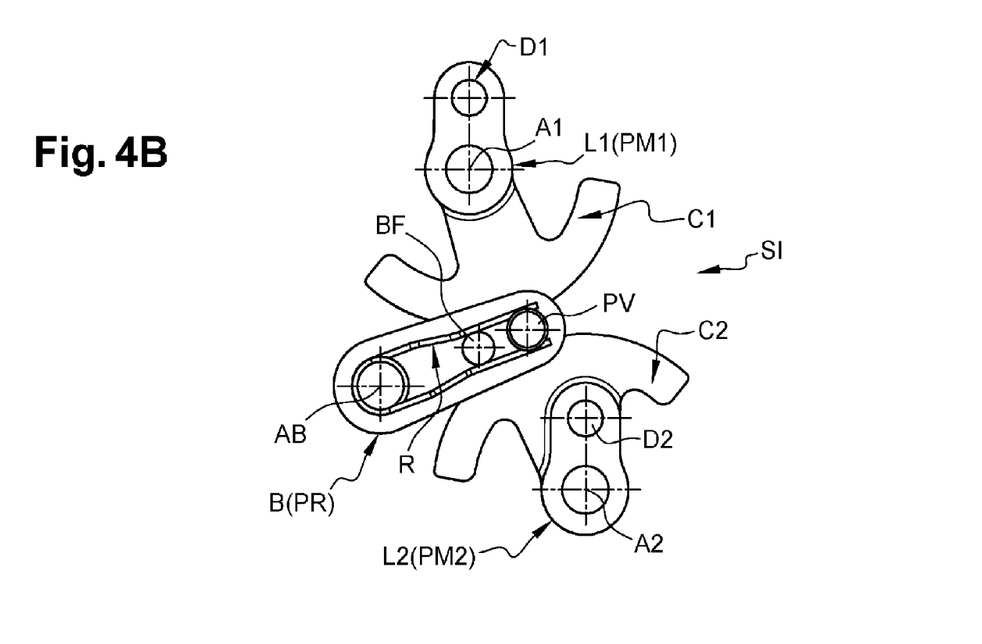
FIG. 4B is a rear face view of the interlocking system of FIG. 4A.
Figure 5A:
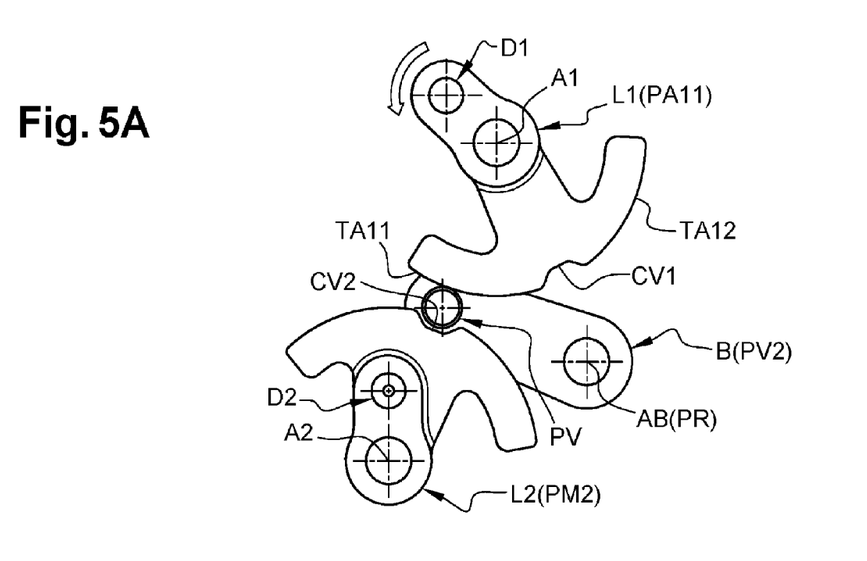
FIG. 5A is a view similar to that of FIG. 4A, in which the first lever is in its active position of changing to a first ratio and the second lever is locked in its neutral position by the interlocking rocker, which is in a locking position.
Figure 5B:
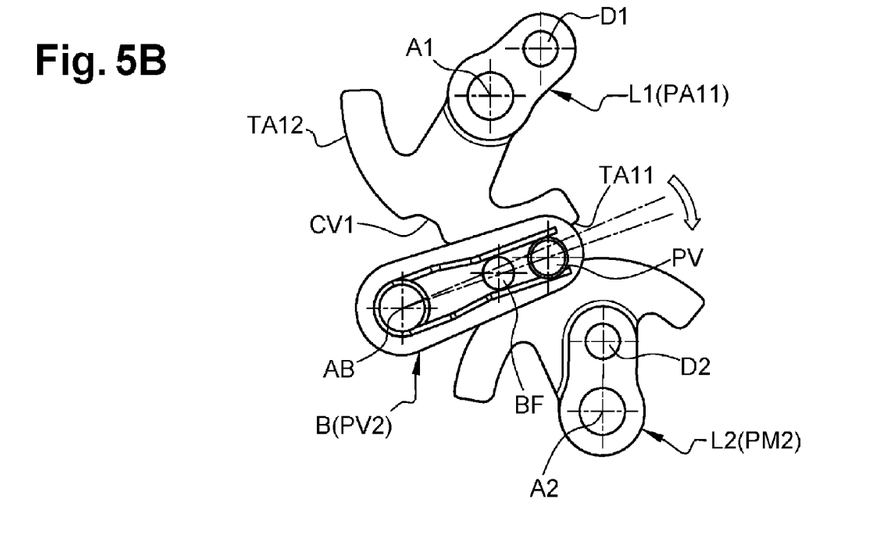
FIG. 5B is a view is a rear face view of the interlocking system 5A.
Figure 6A:
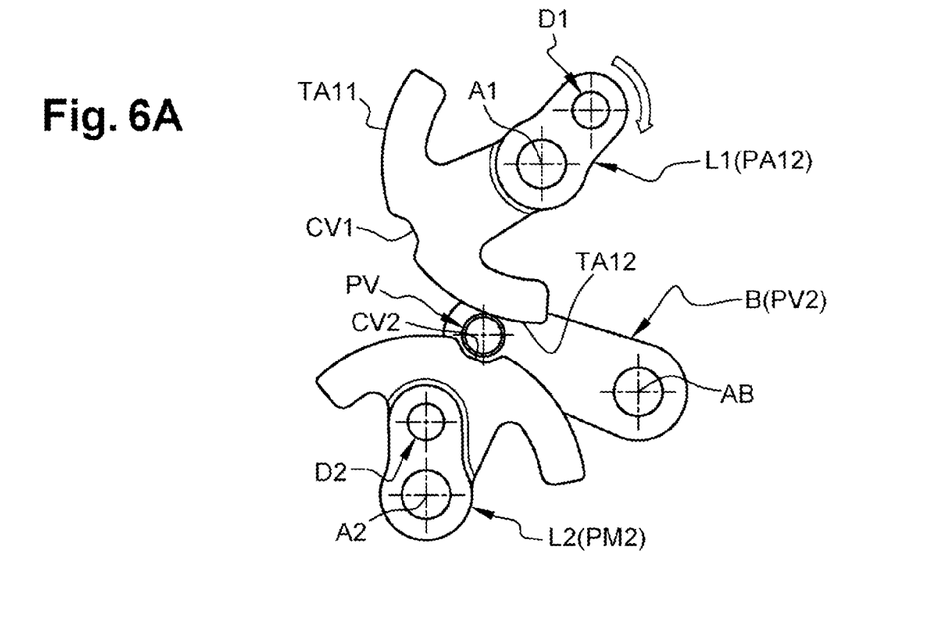
FIG. 6A is a view similar to that of FIG. 4A, in which the first lever is in its other active position of changing to a second ratio and the second lever is locked in its neutral position by the interlocking rocker, which is in a locking position.
Figure 6B:
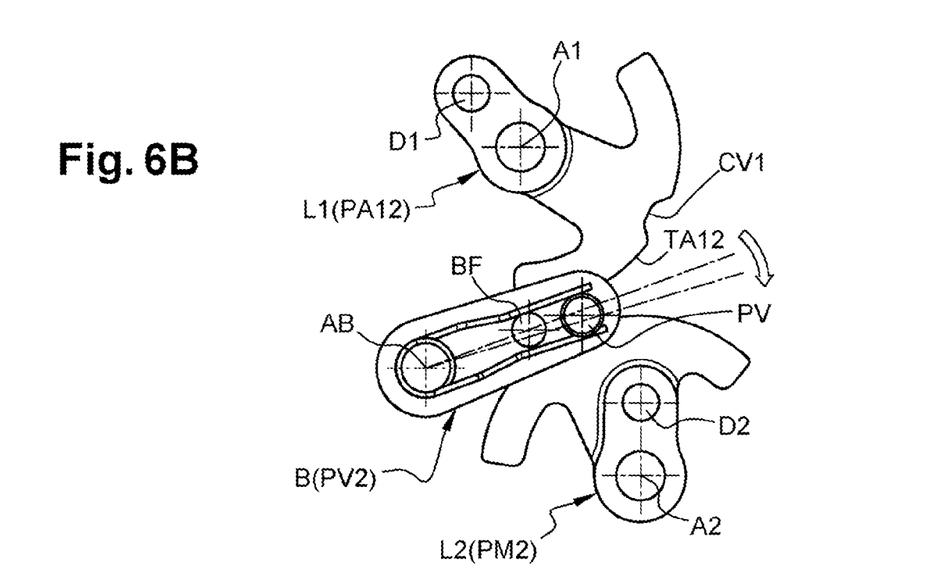
FIG. 6B is a rear face view of the interlocking system 6A.
Figure 7A:
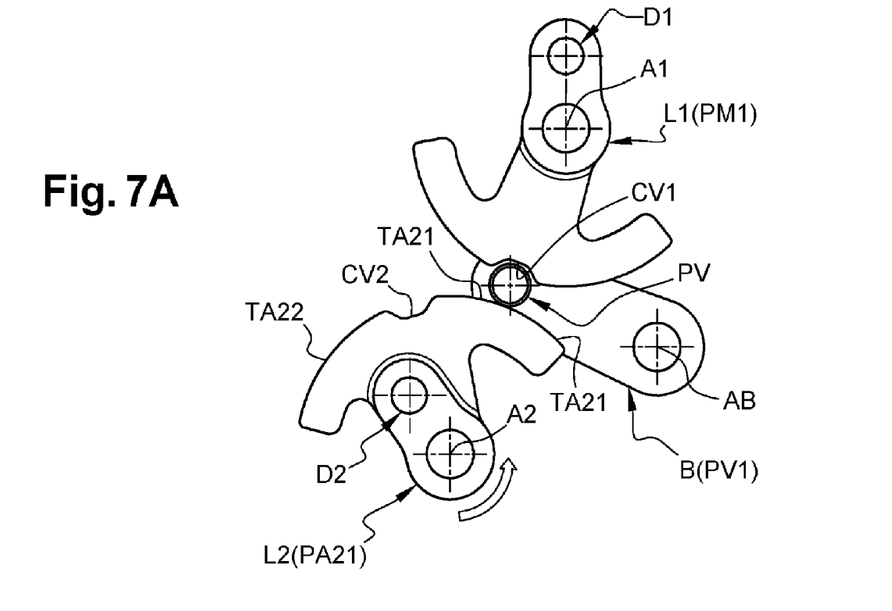
FIG. 7A is a view similar to that of FIG. 4A, in which the first lever is locked in its neutral position by the interlocking rocker, which is in its other locking position, and the second lever is in its active position of changing to a third ratio.
Figure 7B:
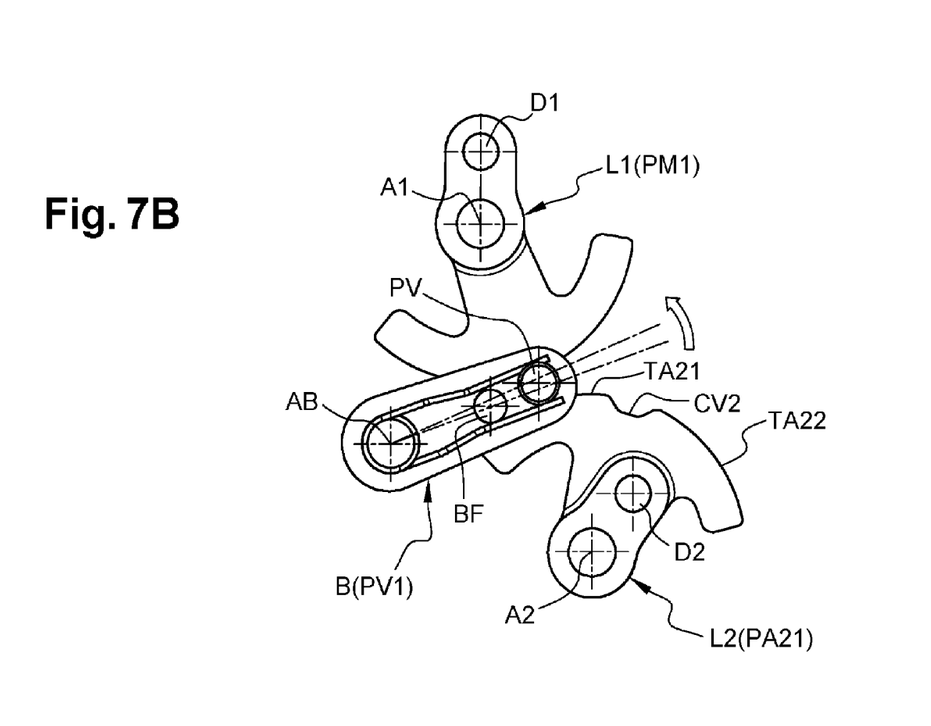
FIG. 7B is a rear face view of the interlocking system 7A.
Figure 8A:
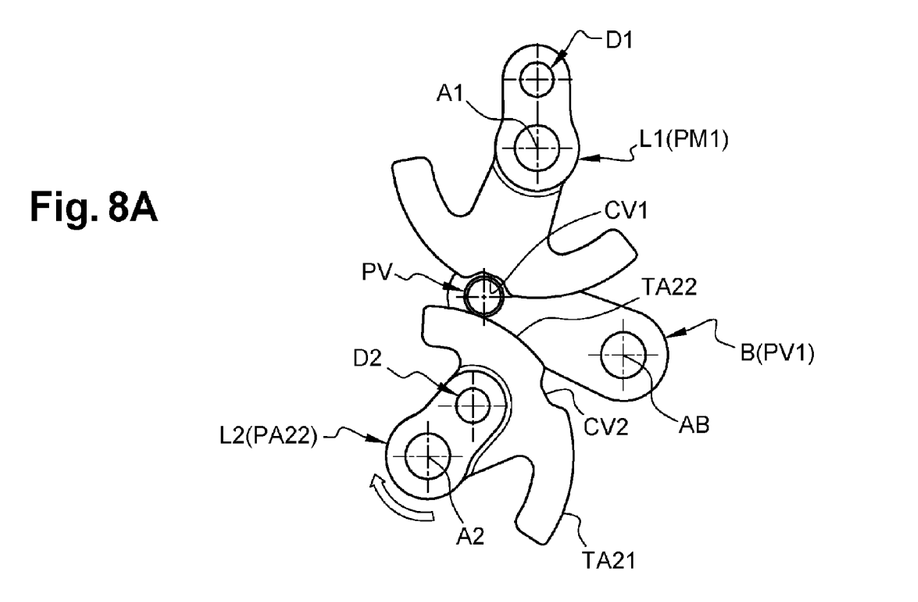
FIG. 8A is a view similar to that of FIG. 4A, in which the first lever is locked in its neutral position by the interlocking rocker, which is in its other locking position, and the second lever is in its other active position of changing to a fourth ratio.
Figure 8B:
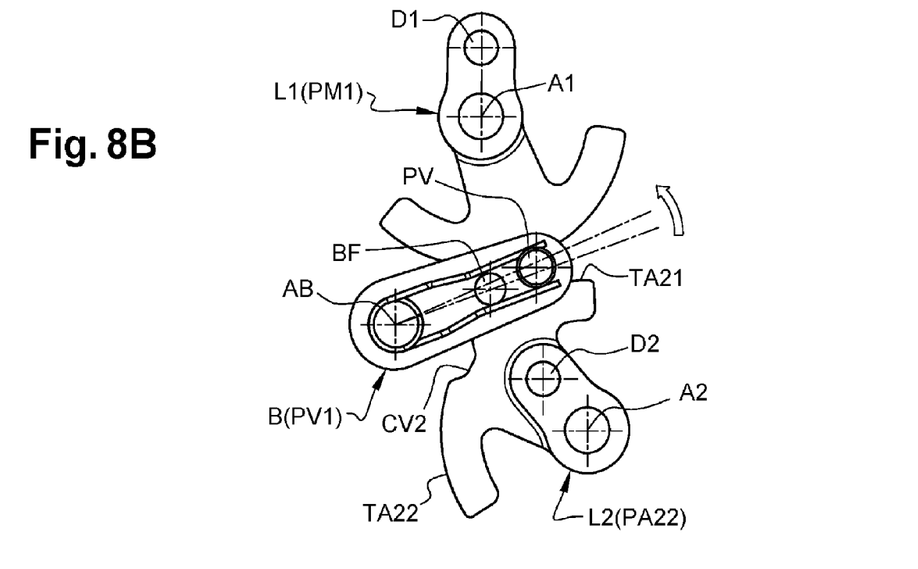
FIG. 8B is a rear face view of the interlocking system 8A.

Drive Assembly in the Neutral Position (FIGS. 4A and 4B):
  each lever L1, L2 is in its neutral angular position PM1, PM2 and the interlocking rocker B is in its position of rest PR,
  the locking pin PV is arranged between the two locking notches CR1 and CR2,
  each lever L1, L2 is free to pivot about its axis A1, A2 in one direction or the other.
  i) Change of the first ratio (FIGS. 5A and 5B):
    by leaving the position illustrated in FIGS. 4A and 4B, the first rotary actuator AR1 drives the first lever L1 to pivot in the anticlockwise direction toward its first active position PA11,
  during this pivoting, the first active portion TA11 of the first cam profile PC1 interacts with the locking pin PV to cause the interlocking rocker B to rock in the anticlockwise direction and the locking pin PV to enter the second locking notch CV2,
    the second lever L2 is then angularly locked in its neutral position PM2,
    by again driving the first lever L1 in the clockwise direction, the interlocking system SI returns to its state shown in FIGS. 4A and 4B, the rocker B being elastically returned by the return spring R toward its position of rest PR.
  ii) Change of the second ratio (FIGS. 6A and 6B):
    by leaving the position illustrated in FIGS. 4A and 4B, the first rotary actuator AR1 drives the first lever L1 to pivot in the clockwise direction toward its second active position PA12,
  during this pivoting, the second active portion TA12 of the first cam profile PC1 interacts with the locking pin PV to cause the interlocking rocker B to rock in the anticlockwise direction and the locking pin PV to enter the second locking notch CV2,
    the second lever L2 is then angularly locked in its neutral position PM2,
    by again driving the first lever L1 in the anticlockwise direction, the interlocking system SI returns to its state shown in FIGS. 4A and 4B, the rocker B being elastically returned by the return spring R toward its position of rest PR.
  iii) Change of the third ratio (FIGS. 7A and 7B):
    by leaving the position illustrated in FIGS. 4A and 4B, the second rotary actuator AR2 drives the second lever L2 to pivot in the anticlockwise direction toward its first active position PA21,
  during this pivoting, the first active portion TA21 of the second cam profile PC2 interacts with the locking pin PV to cause the interlocking rocker B to rock in the clockwise direction and the locking pin PV to enter the first locking notch CV1,
    the first lever L1 is then angularly locked in its neutral position PM1,
    by again driving the second lever L2 in the clockwise direction, the interlocking system SI returns to its state shown in FIGS. 4A and 4B, the rocker B being elastically returned by the return spring R toward its position of rest PR.

iv) Change of the fourth ratio (FIGS. 8A and 8B):
by leaving the position illustrated in FIGS. 4A and 4B, the second rotary actuator AR2 drives the second lever L2 to pivot in the clockwise direction toward its second active position PA22,
during this pivoting, the first active portion TA22 of the second cam profile PC2 interacts with the locking pin PV to cause the interlocking rocker B to rock in the clockwise direction and the locking pin PV to enter the first locking notch CV1,
the first lever L1 is then angularly locked in its neutral position PM1,
by again driving the second lever L2 in the anticlockwise direction, the interlocking system SI returns to its state shown in FIGS. 4A and 4B, the rocker B being elastically returned by the return spring R toward its position of rest PR.

The design of the mechanical interlocking system according to the invention is particularly robust and makes it possible to supplement the interlocking function linked to the control system and to manage the motorized actuators.

The interlocking system according to the invention is easily incorporated in an existing drive assembly E and the ways of joining this assembly to the other components of the gearbox are not modified.

In a variant, within the scope of the invention, the interlocking system is not limited to the case in which each fork shaft moves in the two opposite directions to change two separate ratios.

Each shaft or only one of the two could, for example, move in a single direction.

The interlocking system according to the invention is also not limited to the case in which the levers L1 and L2 are both levers for driving the two fork shafts and levers which are part of the interlocking system.

It is for example possible to use linear actuators for each fork shaft AF1, AF2 and to have a separate arrangement of an interlocking system SI according to the invention in which each finger D1, D2 is solely connected in terms of movement to the associated shaft AF1, AF2.

The invention claimed is:

1. A system for interlocking the movements of two shafts of forks of a gearbox, the system comprising:
    a) a first lever which:
       is mounted so as to be able to pivot, about a first axis, in two opposite directions to take up at least one active angular position in relation to a neutral intermediate angular position,
       bears a first eccentric axial finger connected to a first driveshaft of a first fork, and
       bears a first eccentric cam, a cam profile of which has a first notch for locking the first lever in its neutral position;
    b) a second lever which:
       is mounted so as to be able to pivot, about a second axis parallel to the first axis, in two opposite directions to take up at least one active angular position in relation to a neutral intermediate angular position,
       bears a second eccentric axial finger connected to a second driveshaft of a second fork, and
       bears a second eccentric cam, a cam profile of which has a second notch for locking the second lever in its neutral position; and
    c) an interlocking rocker which:
       is mounted so as to be able to pivot, about a rocking axis parallel to the first axis, in two opposite directions to take up one or the other of two opposite locking angular positions, in relation to an intermediate angular position of rest toward which the interlocking rocker is elastically returned, and
       bears an eccentric axial locking pin which, when the interlocking rocker is in its angular position of rest and when each drive lever is in its neutral angular position, is positioned facing the first locking notch and the second locking notch at the same time,
    wherein in the system, angularly on either side of its locking notch, each cam profile of a lever has an active portion which is able to interact with the locking pin to cause the interlocking rocker to pivot and the locking pin to engage in the locking notch of the cam of the other lever, and then to hold the locking pin in a locking engaged position to angularly lock said other lever in its neutral position.

2. The system as claimed in claim 1, wherein each cam profile has at least one active portion in a shape of a convex circular arc centered on the axis of the associated lever which is adjacent to the locking notch.

3. The system as claimed in claim 2, wherein, irrespective of the angular position of each lever, the locking pin is received between the first cam profile and the second cam profile.

4. The system as claimed in claim 1, wherein, irrespective of the angular position of each lever, the first axis, the locking pin, and the second axis are aligned.

5. The system as claimed in claim 4, wherein, when the interlocking rocker is in its angular position of rest and when each lever is in its neutral angular position, the first axis, the first locking notch, the locking pin, the second locking notch, and the second axis are aligned.

6. The system as claimed in claim 1, wherein each lever is a lever for driving an associated driveshaft of a fork.

7. The system as claimed in claim 1, wherein the first lever is mounted so as to be able to pivot about the first axis in two opposite directions to take up one or the other of two opposite active angular positions in relation to its neutral intermediate angular position, and the second lever is mounted so as to be able to pivot about the second axis in two opposite directions to take up one or the other of two opposite active angular positions in relation to its neutral intermediate angular position.

8. The system as claimed in claim 7, wherein each cam profile has two active portions in the shape of a convex circular arc which are centered on the axis of the associated lever and between which the locking notch is arranged.

9. An assembly for actuating two shafts of forks of a gearbox, said assembly comprising:
    a first rotary and a second rotary actuator which are controlled and the output shafts of which are parallel; and
    the system as claimed in claim 1,
    wherein the first rotary actuator drives the pivoting of the first drive lever, and the second rotary actuator drives the pivoting of the second drive lever.

10. The assembly as claimed in claim 9, wherein the axes of rotation of the output shafts of the two rotary actuators are orthogonal to the parallel sliding axes of the two shafts of forks.

* * * * *